Aug. 27, 1940.　　　　T. IAVELLI　　　　2,212,740
POWER TRANSMISSION
Filed Oct. 26, 1937　　　　5 Sheets-Sheet 1
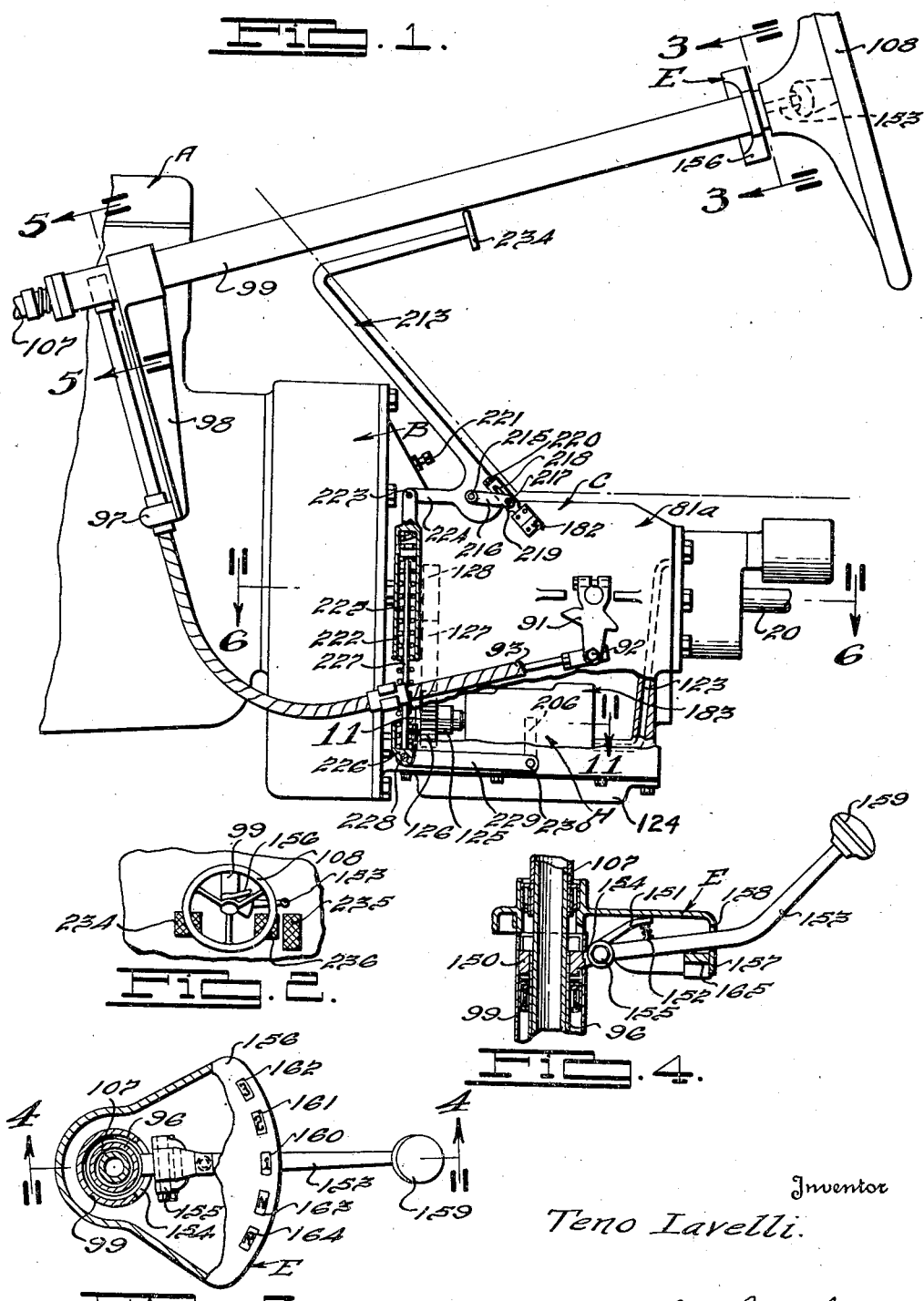
Inventor
Teno Iavelli.

Aug. 27, 1940.　　　　T. IAVELLI　　　　2,212,740
POWER TRANSMISSION
Filed Oct. 26, 1937　　　5 Sheets-Sheet 2
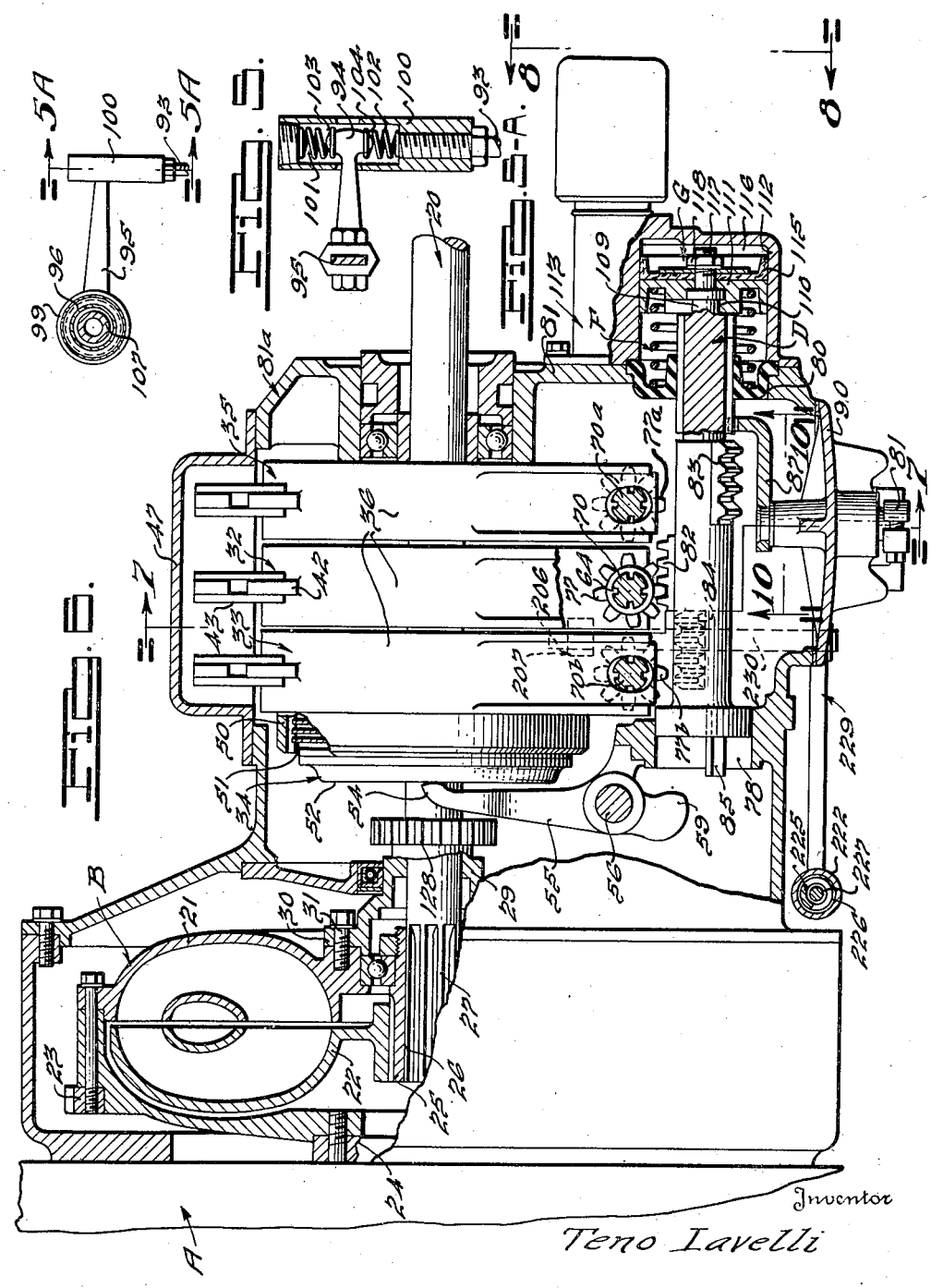
Inventor
Teno Iavelli
By Harness, Dirid, Patee & Harris
Attorneys.

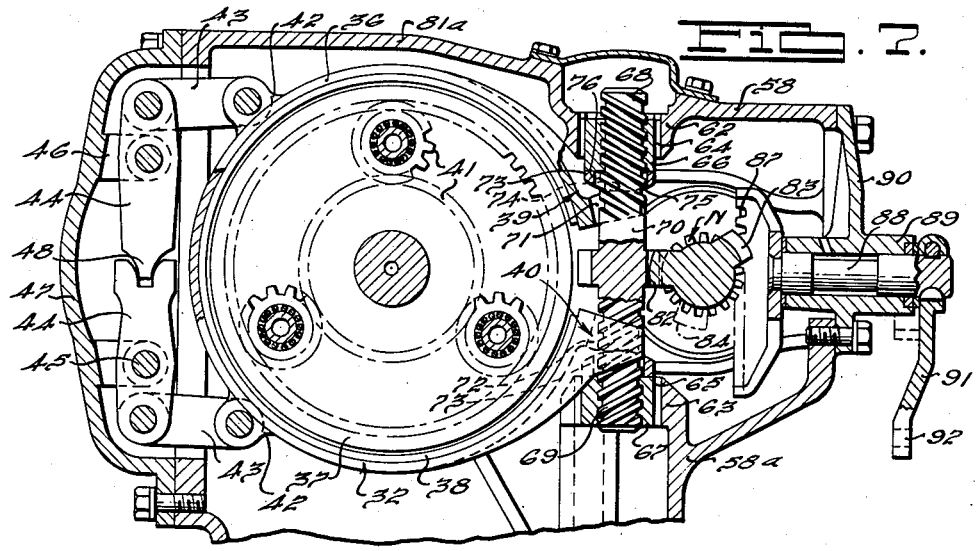
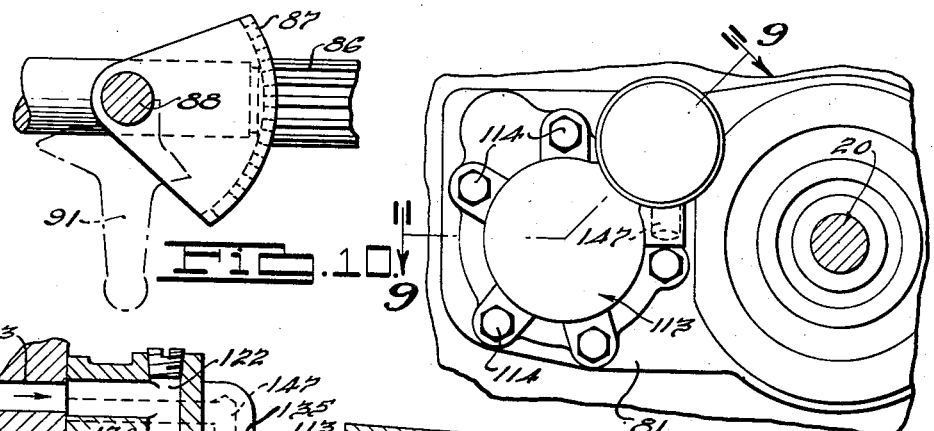
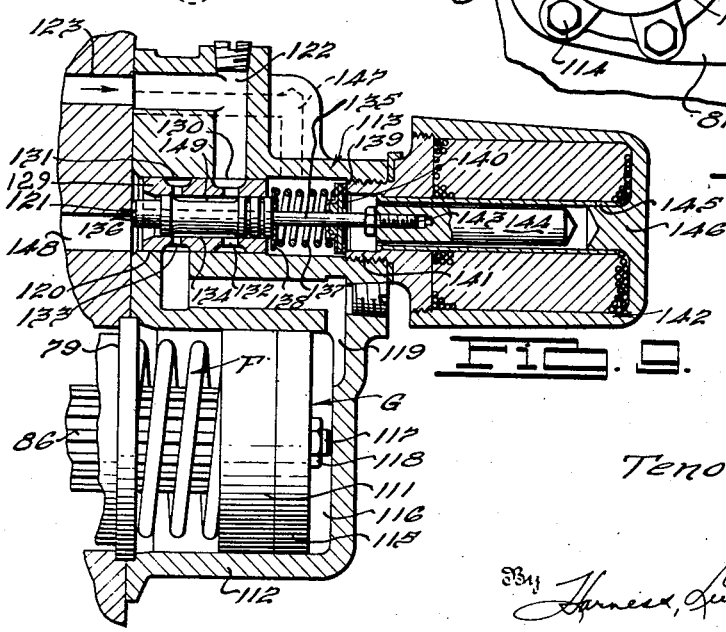

Aug. 27, 1940.  T. IAVELLI  2,212,740
POWER TRANSMISSION
Filed Oct. 26, 1937  5 Sheets-Sheet 4
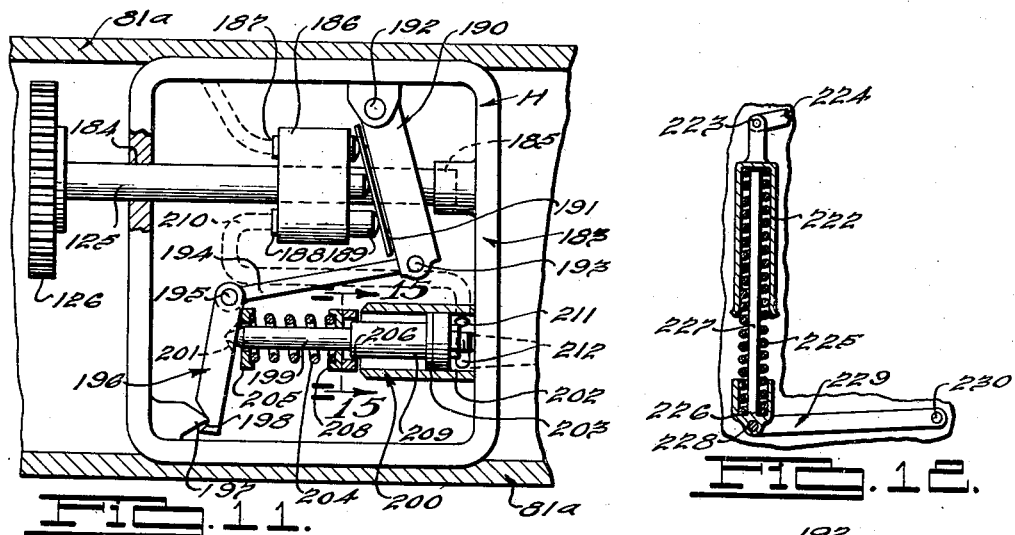
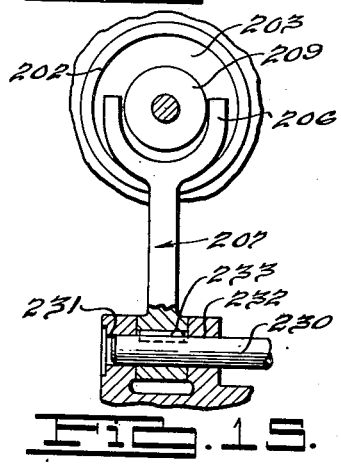
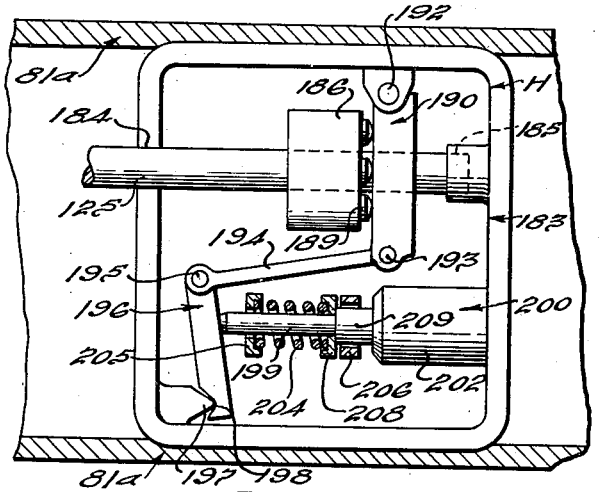
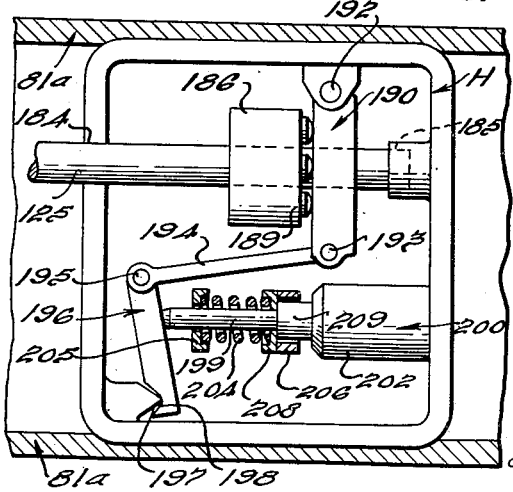
INVENTOR
Teno Iavelli.
BY
Harness, Dirid, Patee & Harris
ATTORNEYS.

Aug. 27, 1940.　　　T. IAVELLI　　　2,212,740
POWER TRANSMISSION
Filed Oct. 26, 1937　　　5 Sheets-Sheet 5
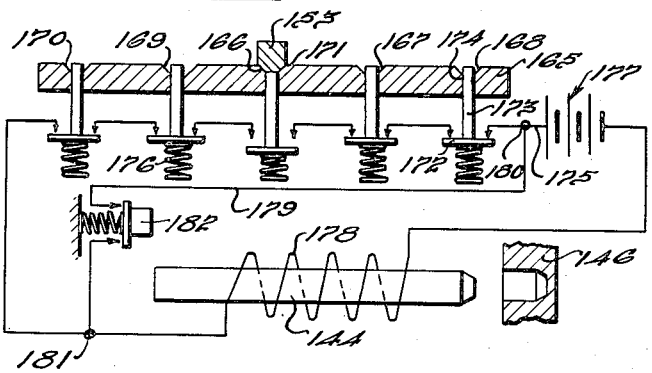
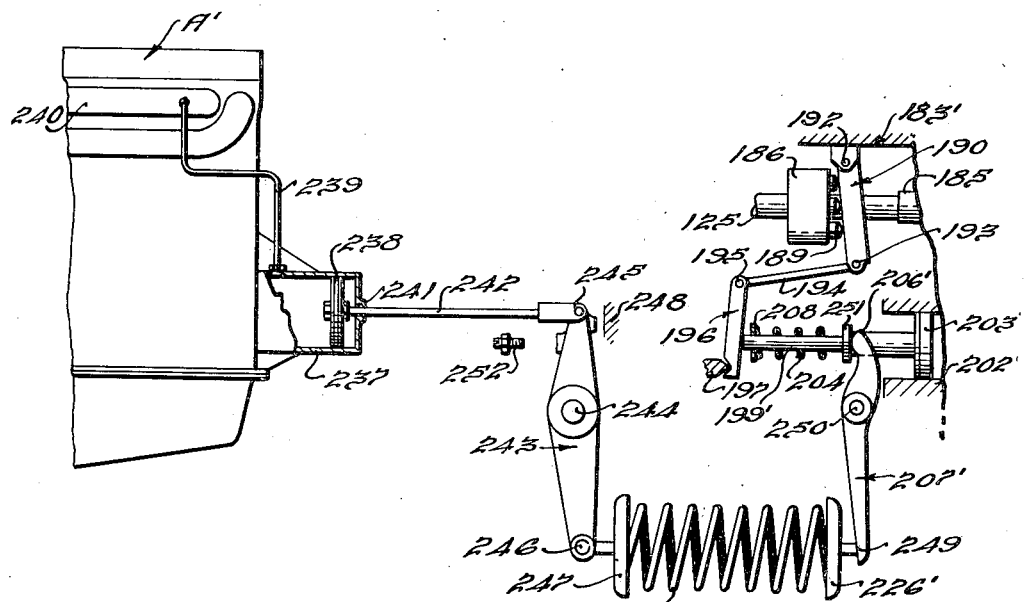
INVENTOR
Teno Iavelli.
BY
ATTORNEYS.

Patented Aug. 27, 1940

2,212,740

UNITED STATES PATENT OFFICE 2,212,740

POWER TRANSMISSION

Teno Iavelli, Detroit, Mich., assignor to Chrysler Corporation, Highland Park, Mich., a corporation of Delaware Application October 26, 1937, Serial No. 171,164

21 Claims. (Cl. 74—262)

My invention relates to power transmission mechanism and refers more particularly to improvements in power transmission systems especially adapted for use in connection with motor vehicles, although not necessarily limited thereto.

This invention, in certain more limited aspects, provides improvements in the drive and control for power transmission systems having epicyclic or planetary gear trains. With such planetary transmissions it is customary to arrange the gearing to provide for the desired number of speed ratios between the engine and vehicle driving ground wheels and such gearing is customarily selected and controlled to obtain the desired driving speed ratio by actuation of any one of a group of transmission gearing controlling devices usually consisting of reaction brake bands associated with and controlling the rotation of corresponding drums or similar elements of the various gears trains.

It is an object of my invention to provide a novel and inexpensive means for controlling the degree of engagement of the speed ratio controlling devices of the transmission.

One object of my invention, in certain more limited aspects, is to provide a variable regulating means whereby the fluid, which actuates the fluid operating means for controlling the brake bands and clutches of the planetary gear trains or other corresponding parts of other types of transmissions, is infinitely regulated from a predetermined low to a predetermined high pressure. In the broader aspects of my invention, the fluid pressure is preferably provided by a suitable liquid medium such as oil, but the fluid pressure medium may be air under pressure greater or less than atmospheric pressure.

Another object of my invention is to provide a novel control for my variable regulating means in the form of a pedal which is preferably substituted for the well-known clutch pedal for controlling the friction plate clutch in a motor vehicle. It is thereby possible for the vehicle driver to depress this pedal in a manner similar to depressing the well-known clutch pedal while changing gears or when it is desirable to release the drive between the engine and the driving ground wheels of the vehicle, during which downward movement of this pedal the pressure of the fluid will be infinitely regulated from a predetermined maximum to a predetermined minimum pressure, at which time a suitable means is provided to release the transmission brake bands and clutches so that these bands and clutches will not operate at low pressure which effects undesirably high slippage. To assist in giving the layman the same "feel" as he gets with the well-known clutch pedal for the friction-plate type of clutch, I prefer to provide with my variable regulating means a novel movement-reducing linkage control so that during the first one-third of the maximum travel of my pedal, the operating pressure from a suitable swash-plate type pump is infinitely controlled, if desired, to approximately one-half of its maximum pressure—then, during the other two-thirds movement of the pedal, the pump pressure is very gradually controlled preferably down to one-third of its predetermined maximum pressure, at which stage I prefer to incorporate an electrical switch to be contacted to actuate the same solenoid which is used to control the master distributor valve of the planetary transmission of such type as is described and claimed in the co-pending joint application of Carl A. Neracher and Teno Iavelli, Serial No. 53,284, filed December 7, 1935, so as to give complete release of all the bands and clutches.

In certain more limited aspects, it is an object of my invention to provide a novel movement-reducing linkage with my variable regulating means so that during the first one-third movement of my pedal, the operating pressure from a suitable swash-plate pump is preferably infinitely controlled to approximately one-third of its maximum pressure—then, during the other two-thirds of the pedal movement the pump pressure is very gradually controlled down to a pressure that is insufficient to overcome the pressure of the rack return spring of such type as is described and claimed in the above mentioned co-pending joint application.

A further object of my invention resides in the provision of a novel movement-reducing means which may, if desired, be interposed between my variable regulating means and my pedal to effect an even reduction in the several inches of travel of the pedal so that my variable regulating means is completely controlled by less than one-half inch of movement.

A still further object of my invention is to provide a novel and inexpensive means for automatically regulating the well-known swash-plate pump—of such type as is described and claimed in the co-pending application of Augustine J. Syrovy, Serial No. 29,788, filed July 5, 1935—in order to continuously control the desirable degree of engagement of the transmission speed ratio controlling devices.

Another object of my invention, in its more limited aspects, resides in the provision of a novel means for conveniently varying the pressure produced by the well-known swash-plate pump and pressure accumulator—of such type as is described and claimed in the aforementioned application No. 29,788—wherein the pressure of the accumulator spring is controlled to effect the variable pump pressure.

Further objects and advantages of my invention will be apparent from the following detailed descriptions of the principles of my invention reference being had to the accompanying drawings in which:

Fig. 1 is a side elevational view somewhat diagrammatic in form illustrating my power transmission mechanism as a whole.

Fig. 2 is a detail elevational view showing the manually controlled selector element and the well-known pedals of a motor vehicle.

Fig. 3 is a sectional view of the manually controlled selecting mechanism taken as indicated by the line 3—3 of Fig. 1.

Fig. 4 is a sectional view along the line 4—4 of Fig. 3.

Fig. 5 is an enlarged sectional elevational view taken approximately as indicated by the line 5—5 of Fig. 1.

Fig. 5—A is an enlarged detail sectional view taken along the line 5A—5A of Fig. 5.

Fig. 6 is an enlarged sectional plan view taken along line 6—6 of Fig. 1 through the transmission and fluid clutch.

Fig. 7 is a sectional elevational view through the transmission, illustrating one of the speed ratio controlling devices and parts associated therewith, the section being taken as indicated by the line 7—7 of Fig. 6.

Fig. 8 is a rear elevational view illustrating the housing mechanism for the fluid pressure operator and associated control valve, the view being taken approximately as indicated by the line 8—8 of Fig. 6.

Fig. 9 is a detail sectional elevational view taken along the line 9—9 of Fig. 8.

Fig. 10 is a detail sectional elevational view taken approximately as indicated by the line 10—10 of Fig. 6.

Fig. 11 is a detail sectional plan view of the transmission pump, accumulator, and my fluid pressure control therefore, the section being taken as indicated by the line 11—11 of Fig. 1.

Fig. 12 is a detail elevational view of my Fig. 1 movement-reducing linkage in its other extreme condition.

Fig. 13 is a detail sectional plan view corresponding to Fig. 11 but illustrating the swash-plate pump in levelled off position.

Fig. 14 is a detail sectional plan view corresponding to Figs. 11 and 13 but illustrating the pump in its minimum pressure condition.

Fig. 15 is a detail sectional elevational view taken as indicated by the line 15—15 of Fig. 11.

Fig. 16 is a diagrammatic view illustrating the electrical system of control between the manually operated section element and the fluid pressure control valve mechanism.

Fig. 17 is a fragmentary elevational view illustrating a modified form of the pressure regulating means.

Referring now to the drawings, I have illustrated my invention in connection with a motor vehicle drive, this drive including a prime mover or engine A, a portion of which is shown in Fig. 1, a main clutch B driven from the engine, and a change speed transmission or gear box C driven from the clutch B. The drive passes from the transmission through the power take-off shaft 20, which as usual, may extend rearwardly of the vehicle to drive the usual ground wheels (not shown).

The clutch B may be of any suitable construction for controlling the drive between engine A and transmission C, this clutch being illustrated in Fig. 6 in the form of a fluid coupling type having the usual driving and driven cooperating vane members 21 and 22 respectively. The driving vane member 21 is carried by the engine flywheel 23, the latter being connected as usual with the rear end of the engine crank-shaft 24. The driven vane member 22 is splined to a hub 25 which in turn is splined at 26 on the forward end of the driven shaft 27. This driven shaft extends rearwardly to drive the power take-off shaft 20 through the intermediary of the various gear trains of transmission C.

Where the power means for operating the transmission is afforded by a fluid such as oil under pressure, the pump for placing the oil under pressure is preferably operated from the engine to maintain the fluid pressure even when the pump is idling. It is therefore preferred to provide a pump drive from the driving clutch member 21 rather than the driven clutch member 22 inasmuch as the latter may be stationary under certain conditions of vehicle operation such as when the vehicle is standing still with the engine idling.

This pump drive may be provided by reason of a driving sleeve or hollow shaft 29 mounted on the shaft 27 but rotatable independently thereof. The sleeve 29 has a hub or flange 30 connected at 31 with the driving vane member 21 of the clutch B so that even when the driven vane member 22 is not being operated from the driving vane member 21, the sleeve 29 will be rotatably driven from the engine crankshaft 24 and flywheel 23. The pump drive from sleeve 29 will be more apparent hereinafter.

I have illustrated the fluid type of clutch B since a clutch of this character has a number of advantages in connection with a transmission of the planetary gear type C and in further connection with our arrangement of vehicle driving controls which will be presently described more in detail. Among the advantages of the fluid type of clutch are the provision of a smooth drive for the vehicle through the planetary transmission, relatively high power driving efficiency, automatic release of the drive between the engine and transmission when the engine is idling, and with the transmission manipulated to establish one of its driving gear ratio settings, and other well known favorable characteristics. I desire to point out, however, that other types of clutches may be employed to control the drive between engine A and transmission C within the broader aspects of my invention. For example, the well known type of friction clutch may be employed and manually operated or automatically operated by the well-known commercial type of vacuum clutch releasing mechanism as will be readily understood.

I have illustrated the change speed transmission C as the epicyclic or planetary type, this general form of transmission being well known in the art and, as usual, includes a plurality of transmission speed ratio controlling clutches or brakes 32, 33, 34 and 35, these braking controlling devices being respectively adapted to actuate the transmission in its first speed ratio or low gear, second speed ratio or intermediate gear, third speed ratio or direct drive, and reverse drive. Other speeds may be provided as desired.

The typical brake device 32 illustrated in Fig. 7 consists of an outer band 36 which substantially surrounds the rotary element or drum 37, the band being provided with friction braking material 38 carried by the band and adapted for frictional engagement with the drum 37. The band 36 has its ends formed with laterally projecting actuating flanges 39 and 40 positioned adjacent each other, means being provided to move the band ends toward each other to contract the band 36 for causing the friction material 38 to brake rotary drum 37, the band having sufficient inherent resilience to expand away from contact with the drum when the actuating means is relieved at the flanged ends 39 and 40. In Fig. 7 the low speed ratio braking device 32 is illustrated in its inoperative position whereby the drum 37 is free to rotate through operation of the planetary gear set 41 somewhat diagrammatically illustrated in association with the drum 37. When the braking device 32 is actuated by contracting the band 36, the drum 37 is held against rotation, the driven shaft 20 in such instance being operated through the planetary gearing 41 to provide the low speed drive for the motor vehicle.

In order to anchor the band 36 and to substantially equalize the braking forces applied to drum 37 around the periphery thereof and thereby substantially avoid a tendency toward lateral loading of the drum and planetary gearing transverse to the axis of the drum, I have provided the band with a circumferentially spaced pair of anchoring flanges 42. These flanges are connected through links 43 with the levers 44 pivotally mounted at 45 with the supporting bracket 46 of the transmission side cover casing 47, the levers 44 being interlocked at 48 so that movement of one of the flanges 42 will be transmitted through the pivotal levers 44 and the links 43 to the other portion of the band associated with the anchoring device. The links 43 are thus pivotally connected at their opposite ends respectively with the anchors 42 and levers 44.

The third speed clutching controlling device 34 is arranged for a direct drive through the transmission and differs somewhat from the braking devices 32, 33 and 35 in that the controlling device 34 has its rotary controlling element 50 adapted for clutching action in a well known manner by frictional engagement through the discs 51 by an axially movable clutching member 52. The latter clutching member is thus engaged by the yoked end 54 of an actuating lever 55 pivotally mounted by a pin 56 suitably supported in the transmission casing. On the opposite side of pivot 56 the lever 55 is provided with a step actuating portion 59, the purpose of which will presently be more apparent.

The transmission casing portions 58 and 58a are respectively provided with the vertically spaced inwardly extending supporting brackets 62 and 63, respectively, these brackets being formed with coaxial splined openings 64 and 65, respectively. Splined within these openings are the nuts 66 and 67 which are axially and oppositely threaded to receive the correspondingly threaded ends 68 and 69 of an operating oscillatory shaft or screw 70.

The shaft 70 extends through openings 71 and 72 respectively, formed to open laterally in the aforesaid band ends 39 and 40, these openings having considerable clearance with shaft 70 so as not to bind on the shaft when the band is contracted and expanded. In order to transmit the thrust of the nuts 66 and 67 to the flanges 39 and 40 so as to relieve distorting loads on the shaft 70 and parts associated therewith, each nut operates a sleeve 73 having a curved face 74 engaging a curved face 75 of band end 39 or 40. The engaged curved faces 74 and 75 provide a rocking freedom of action, each sleeve 73 having a clearance indicated at 76 with the shaft 70.

The operating shaft 70 of the low speed braking device 32 has its portion thereof intermediate the band ends 39 and 40 formed with a gear 77, the means for oscillating shaft 70 through the gear 77 being hereinafter more particularly described.

In the operation of the low speed controlling devices 32 as thus far described, it will be apparent that when the shaft 70 is given a rotary movement, such movement operates through the oppositely threaded ends 68 and 69 of the shaft 70 to cause the nuts 66 and 67 to move inwardly toward each other in their splined openings 64 and 65 respectively, this movement acting through the sleeves 73 to contract the band ends 39 and 40 whereby the low speed drum 37 has its rotation checked for establishing the low speed drive through the transmission. When the shaft 70 is rotated in the opposite direction, the nuts 66 and 67 are moved away from each other and the band 36 is expanded to permit the drum 37 to again rotate and thereby relieve the drive through the transmission controlling device 32.

In order to avoid repetition I have not illustrated all of the details of the brake operated means associated with the controlling devices, 33 and 35, it being understood that such operating means are similar to that described in connection with the controlling device 32. For convenience of reference the operating shaft or screw for the reverse speed braking device is designated as 70a and the corresponding shaft for the second speed braking device 33 is designated at 70b. The gears associated with these screw shafts are respectively designated as 77a and 77b. As will be more apparent presently, the gears 77, 77a and 77b and lever end 59 are adapted to be selectively operated in order to selectively control the engagement and release of the respective speed ratio controlling devices 32, 35, 33 and 34.

I will next describe the common operating means or selector operating element which is adapted for selective engagement under manual control with the aforesaid screw gears 77, 77a and 77b for respectively operating the speed ratio controlling devices 32, 35 and 33; also for operating the direct or third speed controlling device 34; and also for establishing a neutral condition in the transmission.

The transmission casing is adapted to support in a forward opening 78 the reciprocating and oscillating rack or actuating shaft D. The rear bearing for shaft D is provided by a member 79 which is disposed in a suitable opening 80 in the rear end wall 81 of the transmission casing 81a, the rear end of the actuating shaft D being also supported by a piston for reciprocating the shaft and which will presently be referred to in detail.

This actuating shaft D has a series of teeth forming a rack adapted to be brought into operative association with each of the screw gears, these racks being designated at 82, 83 and 84 for respectively operating the screw gears 77, 77ᵃ and 77ᵇ. The forward end of shaft D is further provided with a third speed actuating projection 85 adapted for engagement with the lever shoulder 59 for operating the third speed controlling device 34. It will be noted that the racks and projection 85 are longitudinally spaced along the shaft D and that they are also spaced circumferentially of the shaft whereby upon progressive rotation of the shaft only one of the racks and the projection 85 will engage its associated screw gear or lever 55 at any time.

In Figs. 6 and 7 it will be noted that the shaft D is positioned so that the low speed rack 82 is in position for operating the low speed gear 77 and when the shaft D is moved forwardly or to the left as viewed in Fig. 6, the low speed screw 70 will be rotated to cause the aforesaid braking operation of the low speed controlling device 32 for establishing the low speed drive through the transmission. It will furthermore be noted that with the low speed rack 82 in the position illustrated, the remaining racks 83, 84 as well as projection 85 are free from engagement with their respective associated gears 77ᵃ, 77ᵇ, and the lever 55. From Figs. 6 and 7 it will be noted that the shaft D has a space longitudinally and cirumferentially between the second speed rack 84 and the direct drive projection 85, this space being designated as the neutral space "N" so that when the shaft is positioned with this space facing the screw gears, each of the racks as well as projection 85 will be free from contact with their associated screw gears and lever 55, and the transmission will be in neutral at which time the various braking devices 32, 33, 34, and 35 are released.

In order to selectively rotate the rack D for selectively engaging the racks and projection 85 thereof with the respective screw gears and lever 55, and also for axially operating the shaft in the various positions of selective adjustment, the following mechanism is provided.

Rearwardly adjacent the reverse rack 83, the shaft D is provided with a circular rack or gear 86 meshing with a segmental rack 87 rotatably fixed with a shaft 88, best shown in Fig. 7, this shaft being rotatably journalled by a bearing 89 carried by the transmission side cover 90. The shaft 88 has fixed thereto, outwardly of the transmission cover, a lever 91 connected at 92 (see Fig. 1) to a Bowden wire operating mechanism 93.

The Bowden wire operating mechanism 93 extends forwardly for pivotal connection with a ball end 94 of a lever assembly 95 secured to a tubular shaft 96 as shown in Figs. 5 and 5—A. The forward end of the Bowden mechanism has a guide 97 provided by the bracket 98 rigidly secured to the outer stationary tubular housing 99 comprising the steering post, as best shown in Fig. 1. A yielding connection is preferably provided at some convenient point between the manual selector element, which will be shortly described, and the segmental rack 87 for rotatably adjusting the shaft D. I have illustrated this yielding connection in Fig. 5—A intermediate the lever ball end 94 and the forward end of the Bowden wire mechanism 93. The wire 93 is anchored at its forward end to a housing 100 provided with preloaded oppositely acting springs 101 and 102 which respectively act against the ball seats 103 and 104. The springs 101 and 102 have sufficient rigidity so that normally they provide a rigid connection between lever 95 and Bowden wire 93. However, if for any reason the manually operated adjusting mechanism for the shaft D should bind at any point, the mechanism will be protected during any manual adjustment of lever 95 under such conditions by reason of the ability of springs 101 and 102 to yield. This yielding connection is therefore in the nature of a safety device for the manually controlled selector operating mechanism. The hollow operating shaft 96 extends within the housing 99 and is suitably rotatably journalled therein.

Rotatable within the hollow shaft 96 is the hollow steering shaft 107 operably connected at its upper end to a steering wheel 108 and adapted for operable connection at its lower end to the usual steering mechanism for the front ground wheels of the motor vehicle (not shown). The hollow operating shaft 96 extends upwardly to the point preferably just below the steering wheel 108 to the manually controlled device generally designated at E for selectively controlling or manipulating the transmission speed ratios as will be presently more apparent.

Returning now to Fig. 6, the selector rack shaft D has its rear end adjacent the circular rack 86 provided with a groove 109 adapted to receive the flange 110 of the fluid pressure operating piston assembly 111 adapted for reciprocal movement in the cylinder 112 which is a part of a casting 113 best illustrated in Figs. 8 and 9 as attached at 114 to the rear wall of the transmission. The piston 111 provides the actuating member of the power operating means G for moving shaft D under power to engage the various brake bands and the direct speed clutch 34.

For yieldingly urging the rack shaft D to the right or rearwardly to release the speed ratio controlling devices, I have provided prime mover means F preferably in the form of a compression coil spring surrounding the rear end portion of shaft D between the fixed abutment provided for the bearing member 79 and acting on piston 111. In Fig. 6 it will be noted that the bearing member 79 is conveniently held in positon by clamping the same between the rear casing wall 81 of the transmission and the casting assembly 113.

The piston 111 has a flexible sealing cup 115 adapted to seal the piston against escape of the fluid forwardly of the cylinder 112, the cup 115 bearing against the walls of the cylinder under the action of the fluid pressure introduced to the pressure chamber 116. The sealing cup is held in place by the rearwardly extending threaded reduced end 117 of shaft D together with a fastener or nut 118. Fluid, such as oil under pressure, is introduced to the pressure chamber 116 as best shown in Fig. 9, through a passage 119 leading to the valve controlled chamber or cylinder 120 which slidably receives the fluid pressure supply controlling valve 121.

The cylinder 120 is supplied with oil under pressure through a passage 122 which receives the oil by a conduit 123 formed in the transmission casing casting. The conduit 123, as best shown in Fig. 1, leads to the delivery side of a swash-plate type pump H driven from its location in the oil storing sump or reservoir 124 of the transmission casing by reason of the shaft 125 provided at its forward end by a driving gear 126. This gear meshes with an idler gear 127 which in turn meshes with the driving pinion 128 (see Fig. 6) carried on the rear end of the driving sleeve 29 which, as aforesaid, is fixed to the fluid impeller 21.

A valve guide porting member 129 is pressed into the cylinder 120 so as to be fixed therewith, this porting member having annular conduits 130 and 131, respectively, communicating with the passages 122 and 119. The annular passages 130 and 131 are also respectively provided with the inwardly extending ports 132 and 133 adapted for control by the valve 121. This valve has a sliding fit within the cylindrical bore 134 of the porting member 129, and extending axially through the valve with sufficient clearance to prevent binding thereof, is a valve operating rod 135 preferably of brass or other non-magnetic material. The rod 135 extends forwardly of valve 121 and is provided with a stop 136 adapted to limit forward movement of valve 121 under the influence of a spring 137 which operates between a valve spring abutment 138 and a rear fixed abutment 139, the latter having associated therewith the fluid pressure sealing washers 140 acting against the threaded stem 141 of the electrical solenoid 142.

The rear end of valve operating rod 135 is connected at 143 with the armature 144 of solenoid 142, the armature being adapted for reciprocation in the solenoid cylinder 145 having the rear abutment 146. Any fluid which may leak rearwardly beyond the valve 121 is adapted to drain downwardly from the portion of casting 113 which encloses the valve operating spring 137 by reason of the drain conduit 147, this conduit then extending forwardly to the main body of the transmission where the oil is permitted to drain back to the reservoir 124. A further conduit 148 is adapted to return the oil from operating cylinder 116 back to the reservoir, this conduit 148 opening rearwardly to the forward end of valve 121.

The valve 121 has the reduced valving portion 149 adapted to place the conduits 122 and 119 in communication when the valve is in its forward position under the influence of spring 137. In the drawings, the parts are shown in their positions for operating the low speed controlling device 32, the valve 121 being positioned forwardly so that the fluid pressure is just being delivered from the supply conduit 122 to the conduit 119 and the pressure chamber 116 of the cylinder 112. When the valve 121 moves rearwardly under the influence of solenoid 142, as will be presently more apparent, the spring 137 will be compressed and the reduced portion 149 will no longer provide communication between conduits 122 and 119. At such time the conduit 119 will be open through the port 133 to the discharge conduit 148 for returning the oil from the pressure chamber 116 back to the reservoir 124. When the valve 121 moves forwardly under the influence of spring 137, the reduced valve portion 149 affords communication between conduits 122 and 119 to supply H to operate the piston 111 and selector rack shaft D forwardly for actuating one of the speed ratio controlling devices 32, 33, 34 or 35, depending on the rotative selective adjustment of the selector rack shaft, as will be presently more apparent.

The function and operation of the manually controlled selector mechanism E in relation to the selector rack shaft D will now be further described.

Secured to the upper end of the hollow operating shaft 96, as best seen in Fig. 4, is an annular collar 150 having an integral laterally extending projection 151 providing an abutment for a spring 152 which has its lower end yieldingly acting against an intermediate portion of a manually operated selector element or lever 153. It will be noted that the extension 151 projects through an arcuate opening 154 of the fixed housing 99 to accommodate oscillating adjustment of the extension 151.

The inner end of selector lever 153 is pivotally mounted at 155 to an intermediate portion of the collar extension 151 so that the selector lever may have vertical movement on pivots 155 relative to the extension 151 but when lever 153 is moved around the axis of the steering post housing 99, the collar 150 together with its extension 151 and the shaft 96 will be rotatively moved as a unit.

Fixed on the upper end of the housing 99 is a housing 156 preferably in the shape of a sector. The outer end of this housing has a downwardly extending flange 157 provided with an arcuate opening 158 through which the lever 153 extends for arcuate adjustment. The outer end of the selector lever is provided with a knob or handle 159 adapted for convenient grasp by the hand of the motor vehicle driver.

The outer curving edge of housing 156 is preferably formed with a number of legends characterizing the various positions of manual adjustment of selector lever 153 depending on the number of stations of adjustment for this lever. In the particular embodiment illustrated, the selector lever 153 is adapted to have five positions of adjustment 160, 161, 162, 163, and 164 bearing the legends indicated in Fig. 3 designating the lever positions corresponding to first, second, third, neutral and reverse conditions of control for the transmission.

The flange 157 of housing 156 carries an arcuately arranged switch mechanism below the selector lever 153, this mechanism being best illustrated in the wiring diagram of Fig. 16. This switch comprises an arcuate floor 165 provided with a series of grooves or notches 166, 167, 168, 169 and 170 corresponding respectively to the positions of selector lever 153 when adjusted to the stations 160 to 164, inclusive. The upper sides of the aforesaid notches are preferably chamfered or beveled, as shown in Fig. 16 and the portion of selector lever 153 engageable with these notches is likewise beveled as indicated at 171.

When the operator desires to select any condition of control of the transmission, he swings the selector lever 153 into the desired position, the spring 152 yieldingly urging the selector lever downwardly into engagement with one of the notches of the switch member 165.

Referring now to the wiring diagram illustrated in Fig. 16, I have provided a plurality of switches or contacts 172 for each of the notches of the switch member 165 and being adapted for operation by a stem 173 slidable in an opening 174 communicating with each of the switch notches so that when the selector arm is located in any of the switch notches, one of the stems 173 associated with such notch is engaged by the selector lever and is pushed downwardly by the spring 152 to break the current through the wire 175 which connects all the switches 172 in series. Each switch 172 has a spring 176 associated therewith for restoring the switch to its contacting position and raising its stem 173 as soon as the selector lever is moved out of one of the notches. The wire 175 connects with one terminal of a storage battery 177, the other end of wire 175 being connected to the windings 178 of solenoid armature 144 aforesaid, which is grounded at the other terminal of battery 177. A wire 179 is electrically interposed at 180 and 181 between the extremes of wire 175 to be arranged in parallel with wire 175, a single switch 182 being carried by wire 179 to normally break this circuit as illustrated and under such conditions as will hereinafter be more apparent.

My manually controlled selector operating mechanism is practically instantaneous in its response to selective adjustment of the lever 153 and the different selections may be made as rapidly as desired. In the general operation of the selector mechanism E for changing the transmission speed ratio, the operator moves the selector lever 153 from one of the station notches in the switch member 165. Just as soon as the selector lever is moved from one of the notches, the switch 172 associated with such notch will be closed thereby inducing an electrical circuit through the solenoid windings 178 for causing the solenoid armature 144 to move rearwardly against the abutment 146. This rearward movement of the solenoid armature will adjust the valve 121 rearwardly to place the fluid pressure chamber 116 of cylinder 112 in communication with the reservoir discharge conduit 148 whereupon spring F will move the shaft D rearwardly to release any of the controlling devices 32 to 35 which might have been in operation. This entire phase of the operation takes place very quickly during the initial part of adjustment of the selector lever out of one of the notches of the switch member 165. The selector lever 153 may then be moved into any other station of control and dropped into the corresponding notch for such position.

When the selector lever is so released it will be apparent that one of the switches 172 corresponding to such newly selected position will be opened thereby interrupting the electrical circuit through the wire 175 to the solenoid windings 178. At such time the spring 137 will immediately act to move the valve 121 and armature 144 forwardly to establish communication between the fluid pressure supply conduit 122 and the pressure chamber 116. This will immediately cause a forward movement induced by the fluid pressure on the shaft D for operating one of the selector controlling devices which may have been selected for the new position or else for operating shaft D without causing any movement of any of the speed ratio controlling devices in the event that neutral was selected.

Returning now to the aforesaid cycle of operation and to the point where the selector lever 153 was described as having been moved out of one of the notches preparatory to movement thereof into a newly selected notch, just as soon as the solenoid armature 144 moves rearwardly to operate valve 121 to vent the pressure chamber 116, it will be apparent that the fluid pressure load is removed from the shaft D which is now in its rearward position so that arcuate movement of the selector lever 153 will operate through the hollow steering post shaft 107, Bowden wire mechanism 112, and sector 87 to rotatably adjust the shaft D into a new position for actuation of one of the speed ratio controlling devices. The mechanism operates almost instantaneously so that there is practically no resistance to immediate arcuate adjustment of selector lever 153 from a position in one of the notches although any binding tendency experienced at the shaft D during the initial or other tendency to move the shaft will be taken up yieldingly through the Bowden wire connection shown in Fig. 5—A.

Referring now to the details of the pump H and my variable pressure regulating means therefore, the pump assembly includes a casing structure 183 adapted to be attached to the transmission structure as illustrated in Figs. 1 and 11. The casing receives the pump drive shaft 125 aforesaid, which is suitably journalled at 184 and 185 by the casing. Shaft 125 is illustrated with its gear 126 (best shown in Fig. 1) in constant mesh with idler gear 127 which in turn is drivingly connected with the fluid-impeller-associated driving pinion 128. A pump rotor 186 is drivingly connected to shaft 125. Inlet and outlet passages 187 and 188 respectively supply and deliver fluid in the well-known manner to the inlet and outlet parts of the pumping cylinders of rotor 186. Th pistons 189 are adapted to operate in the well-known circumferentially spaced cylinders opening inwardly toward a wabble or swash-plate 190.

The pistons are urged rearwardly in the well-known manner, as is described and claimed in the aforesaid application No. 29,788, into contact with the swash-plate 190, the inner rounded end of each piston slidably engaging an outer ring 191 which is rotatably supported by plate 190. A suitable pivotal support is provided for plate 190 at 192 on the casing 183. The other side of plate 190 is pivotally connected at 193 to a forwardly extending link 194 pivoted at 195 to a rocker beam 196.

A suitable knife-edge fulcrum 197 on casing 183 is adapted to act against a recess 198 provided by the forward face of beam 196. To oppose the rearwardly acting forces of fulcrum 197 and link 194 the forward end of an accumulator piston rod 199 of a pressure accumulator 200 is adapted to act against the beam 196 through a suitable recess 201 as will presently be more apparent.

Slidable in a cylinder 202 carried by casing 183 is a piston 203 which is adapted under certain conditions to be urged inwardly by a heavy spring 204, the rod 199 being fixed to piston 203 in order to swing the beam 196 for levelling-off the plate 190 and minimizing or eliminating reciprocation of pistons 189. The rod 199 is adapted for reciprocatory movement within a hollow end member 205 fixed to the casing 183 and serving as a forward stop for the spring 204.

A yoke portion 206, best shown in Figs. 11 and 15, of a shifter fork 207 is adapted to normally hold an abutment member 208 against the accumulator spring 204 in a pre-loaded condition. The accumulator piston rod 199 has formed thereon a cylindrical portion 209 which normally is positioned away from the abutment member 208 as illustrated in Fig. 11, but is capable of being moved with the piston rod 199 into contact with the member 208 as in Fig. 13 without striking the yoke portion 206. When the piston 203 is urged forwardly by fluid pressure within cylinder 202, as will presently be more apparent, the forwad end of rod 199 foces the rocker beam counterclockwisely around fulcrum 197 until the rod cylindrical portion 209 contacts the abutment member 208—and upon additional pressure build-up within cylinder 202 the portion 209 moves the abutment member 208 just sufficiently to carry it away from the yoke portion 206 as in Fig. 13 and to thereby have the portion 209 bear the force of the spring 204 acting through the abutment member 208, at which time the pump swashplate 190 is balanced and the fluid pressure is at its maximum.

As described the piston 203 moves forwardly in response to the fluid pressure within cylinder 202 as the fluid is delivered by pump H through the intermediary of outlet passage 188 and a conduit 210 to an inlet 211 of the accumulator cylinder 202. The fluid under pressure is led to a suitable point of usage from cylinder 202 through a casing passage 212. The rearward wall of casing 183 closes off the inner end of cylinder 202.

As the shaft 125 drives rotor 186, with plate 190 positioned as in Fig. 11 for maximum stroke, approximately half the pistons 189 are moving inwardly drawing in oil through the inlet passage 187, while the remaining pistons are discharging oil under pressure through outlet passage 188 for passage to cylinder 202 in the well-known manner.

When the pump H is initially operated, the pressure of the oil delivered at inlet 211 to cylinder 202 rapidly builds up to the desired amount, say 400 pounds per square inch for example determined by the value of spring 204, and as this pressure is being built up the piston 203 moves outwardly to increase the capacity of cylinder 202. During this forward movement of rod 199 to its position of Fig. 13, the rocker beam 196 swings plate 190 about its pivot 192 into a position approximately transverse to the axis of shaft 125. This levelling-off of plate 190 progressively lessens the stroke of pistons 189 until they are substantially motionless so far as reciprocation is concerned, assuming of course that oil under pressure is not being relieved from the delivery system. Any minor leakages which may be present in the delivery system will require only a small movement of the pistons to maintain the maximum desired oil pressure in cylinder 202.

The accumulator cylinder 202 stores oil under pressure so that when oil is delivered under pressure at passage 212, the spring 204 expands and tends to prevent an otherwise rapid fall of the fluid pressure.

When the yoke portion 206 is slightly moved forwardly under the Fig. 13 or maximum fluid pressure condition of pump H, the abutment member 208 is just taken away from its seat on the forward end of the piston rod cylindrical portion 209—during which movement the fluid pressure is gradually reduced to its predetermined minimum pressure by reason of the pressure chamber not having so great a force to act against inasmuch as the pressure of the accumulator spring on portion 209 is gradually reduced. I prefer to use a minimum fluid pressure of about one-third of the predetermined maximum for reasons as will hereinafter be more apparent.

The electrical switch 182, if desired, may be suitably mounted on transmission casing 81ª so that a pedal 213 will close the switch at the extreme end of the pedal movement. To this end the pedal 213 has fixed thereto at 215 a link 216 which is supported at its other end at 217 within an elongated slot 218 of an arm 219 of switch 182. An adjustment 220 is adapted to adjust the link support 217 within the slot 218 to insure the closing of the switch 182 when the pedal 213 is about fully depressed against an adjustable stop 221.

In the Fig. 16 electrical diagram it will be noted that when the switch 182 is closed, a circuit is completed through wire 179 between the wire 175 and the solenoid windings 178. Thus, it is evident that the closing of switch 182 will cause the solenoid armature 144 to move rearwardly to abutment 146 even though one of the switches 172 is open to break the circuit through wire 175. This rearward movement of armature 144 would also be effected when the switch 182 is closed although all the switches 172 are closed at that time by reason of the vehicle driver lifting the selector lever 153 to select another speed ratio. The rearward movement of armature 144 aforesaid opens the conduit 119, through the port 133, to the discharge conduit for returning the oil from the pressure chamber 116 back to the reservoir 124. This armature movement effects a complete release or neutral position for each of the controlling devices 32, 33, 34, and 35 so that no drive is transmitted to the power take-off shaft 20.

Upon the beginning of the pedal's return to its Fig. 1 position the link support 217 allows the arm 219 to return to its normal position of Fig. 1 at which time the electrical circuit through wire 179 is broken. The breaking of this circuit causes the armature 144 to return to its illustrated station of Fig. 9 under the influence of spring 137, the reduced valve portion 149 again affording communication between conduits 122 and 119 to supply fluid pressure from the pump H to operate the piston 111 and rack D forwardly for actuating one of the speed ratio controlling devices 32, 33, 34, and 35.

I have provided a novel movement reducing linkage control for my variable pressure pump regulating means which may be used therewith, if desired. A hollow cylinder 222 (best shown in Figs. 1 and 12) has a closed end provided with an articulated connection 223 on bellcrank arm 224 of pedal 213. Inside this cylinder 222 is a preloaded coiled spring 225 which extends beyond the open end of cylinder 222 and against an end cap 226. A spine member 227 is suitably fixed to end cap 226 and is adapted to reciprocate within spring 225 to prevent lateral movement of this spring. A pivotal support 228 for end cap 226 is provided by a link member 229, the other end of this link member having fixed thereto a shaft 230 which extends inwardly toward the vertical longitudinal mid-plane of the transmission C. The shaft 230 is rotatably supported by the casing 81ª at 231 and 232 and is adapted to transmit its axial movement to the shifter fork 207 through a suitable locking means such as key 233 (best shown in Fig. 15). If desired, a resilient connection (not shown) may be interposed between the link member 229 and the shifter fork 207 to absorb the lateral rocking motion of the transmission when the engine A is running.

By depressing the face 234 of pedal 213 until the pedal strikes the stop 221, a comparatively long arc of arm 224 is reduced by cylinder 222 compressing spring 225, as illustrated in Fig. 12, thus effecting but a very short arc of movement of pivotal support 228 about shaft 230. My movement-reducing linkage control thereby regulates with a comparatively longer arc of movement, my variable regulating means requiring a shorter control movement—the spring 225 tending to return the pedal 213 to its Fig. 1 position.

The relationship of the bellcrank arm 224 to the support 228 of link member 229 may be made, if desired, so that as the pedal face 234 is depressed to substantially one-third of its complete travel, the member 229 will swing sufficiently to transmit forward movement to the yoke portion 206 for causing the yoke portion to carry the abutment member 208 sufficiently away from the cylindrical portion 209 in its maximum pressure position of Fig. 13 to reduce the pump pressure to about one-half of its aforesaid maximum fluid pressure in the earlier described manner. Now, as the pedal face 234 is moved to the stop 221, the yoke portion 206 moves the abutment member 208 forwardly to its predetermined minimum fluid pressure of the spring 204 against the cylindrical portion 209 is relieved entirely in order to cause the pump pressure to be reduced to the predetermined minimum fluid pressure of about one-third of the maximum pressure as described earlier.

At the extreme end of the movement of pedal face 234, the link 216 closes the switch 182 for actuating the solenoid armature 144 to release the controlling devices 32, 33, 34, and 35.

If desired, my variable regulating means may be so arranged that the pedal 213 will gradually move the yoke portion 206 forwardly to carry the abutment member 208 from its Fig. 13 to its Fig. 14 station at which time the pressure of pump H is insufficient to overcome the pressure of spring F tending to return the rack D to its Fig. 6 condition—thus providing a neutral position for the controlling devices 32 to 35 without using the electrical switch 182.

One feature of my invention resides in the simple control that is possible with my novel transmission system, one preferred embodiment of this control being illustrated in Fig. 2 wherein it will be observed that the selector lever 153 is positioned for manipulation laterally to the right of the steering wheel 108 for effecting a change in the condition of the transmission. My transmission provides for convenient manipulation of the motor vehicle by providing the engine throttle control or accelerator pedal 235 preferably at the right hand side of the steering post 99 so that it may be manipulated by the right foot of the driver. On the same side of the steering post is a pedal 236 which is adapted to operate the wheel brakes of the motor vehicle, and on the other side I have provided the pedal face 234 for convenient manipulation by the left foot of the vehicle driver. The pedal face 234 is thus apparently the well known friction-plate clutch pedal and has the same "feel" when operated by the driver, as will presently be more apparent.

In the operation of my transmission as the pedal face 234 is depressed to about one-third of its maximum movement, the yoke portion 206 moves the abutment member 208 sufficiently away from the cylindrical portion 209 to effect a decrease in the fluid pressure to about one-half of the predetermined maximum fluid pressure—the speed ratio controlling device 32, 33, 34, or 35 providing the prior speed ratio drive in the meantime being operated with less and less pressure in cylinder 202 and, consequently, with more and more slippage of the drum 37. Completion of the movement of pedal face 234 moves the abutment member 208 further and further away from cylindrical portion 209 to its Fig. 14 position, and very gradually decreases the fluid pressure to about one-third of the predetermined maximum pressure so that the selected controlling device 32, 33, 34 or 35 is operated by less and less pressure in cylinder 202 until there is just sufficient pressure to prevent the drum 37 from slipping undesirably. At the extreme of the pedal movement the link 216 closes the switch 182 to move the solenoid armature rearwardly to completely release all the controlling devices 32, 33, 34 and 35.

On the return movement of pedal 213, assisted by spring 225 the link 216 allows the switch 182 to open again and return the armature 144 as earlier described, and the fluid pressure is controlled in a manner just the reverse of the downward pedal movement—until the pedal is again in its illustrated position of Fig. 1 at which time the fluid pressure is once more at the predetermined maximum.

It is obviously evident that the increased slippage of the drum 37 is very gradual as the pedal face 234 is depressed. Furthermore, the relationship of arm support 223 to link support 228 is such that one-half of the maximum fluid pressure is reduced while the pedal face 234 travels about one-third of its total movement, and that the fluid pressure is further gradually reduced to about one-third of its predetermined maximum as the pedal movement is completed, at which time the switch 182 is closed to give a neutral position for the transmission C. Thereby the driver always effects a smooth and quiet speed ratio change inasmuch as slippage of the selected controlling device is desirably high until the pedal face 234 is nearly at its Fig. 1 station.

Attention is directed to the fact that the vehicle driver does not necessarily have to fully depress the pedal face 234 while selecting a speed ratio. For example, he may depress the pedal face to a predetermined distance to effect a predetermined amount of slippage of the selected controlling device—depending on the kind of vehicle performance he desires. On the other hand, it is not necessary for the driver to depress the pedal face at all while selecting a speed ratio, for the fluid clutch B will absorb to a great extent any harsh action resulting from such a power shift.

It is not my intention to limit my invention to the degrees of fluid pressure control hereinbefore described, since these are for illustrative purposes only.

The selector operating mechanism is practically instantaneous in its response to selective adjustment of the lever 153 and the different selections may be made as rapidly as desired. In the general operation of the selector mechanism E for changing the transmission speed ratio, the operator depresses the pedal face 234 if he desires a soft quiet speed ratio change at that instant, and moves the selector lever from one of the station notches in the switch member 165. Just as soon as the selector lever is moved from one of the notches, the switch 172 associated with such notch will be closed—thereby inducing an electrical circuit through the wire 175 to the solenoid windings 178 for moving the solenoid armature 144 rearwardly. This rearward movement of the solenoid armature will adjust the valve 121 rearwardly to place the fluid pressure chamber 116 of cylinder 112 in communication with the reservoir discharge conduit 148 whereupon the spring F will move the shaft D rearwardly to release any of the controlling devices 32 to 35 which might have been in operation. The selector lever 153 may then be moved into any other station of control and dropped into the corresponding notch for such position.

When the selector lever is so released, it will be apparent that one of the switches 172 corresponding to such newly selected position will be opened—thereby interrupting the electrical circuit through the wire 175 to the solenoid windings 178. At such time the spring 137 will immediately act to move the valve 121 and armature 144 forwardly to establish communication between the fluid pressure chamber 116. This will immediately cause a forward movement induced by the fluid pressure on the shaft D for operating one of the selector controlling devices which might have been selected for the new position or else for operating shaft D without causing any movement of any of the speed ratio controlling devices in the event that neutral was selected.

My variable regulating means with the pedal control is further desirable when starting the vehicle motor in cold weather, inasmuch as the speed ratio controlling devices are allowed to slip to suit the driver's convenience as he depresses the foot pedal preparatory to warming up the engine or to making the speed ratio changes while driving the vehicle. Without my arrangement the vehicle would creep by reason of this inherent characteristic of the fluid coupling B and the fact that the oil on the speed ratio controlling devices is cold and tacky, and furthermore the engagement of these controlling devices would be harsh because of the maximum fluid pressure with the engine idling fast also—all of which tends to effect unevenness of control and stalling of the engine.

Referring now to the modified embodiment illustrated in Fig. 17, I have provided an arrangement incorporating a novel automatic control for my variable pump pressure regulating means. It will be understood that this modified arrangement is intended to be substituted for the correponding parts previously described and the entire mechanism and the operation of the same will not again be duplicated. I have indicated parts of similar function but different construction by primed reference characters.

It will be noted that I have eliminated the pedal control for the vehicle operator, and instead have provided a cylinder 237 within which a piston 238 is adapted to reciprocate as will hereinafter be more apparent. The prime mover of piston 238 is illustrated as a vacuum within the portion of cylinder 237 ahead of the piston by reason of a conduit 239 extending therefrom to a suitable cut-in of the engine intake manifold 240. In the broader aspects of my invention my automatic control may be used with a fluid pressure medium or air under pressure greater or less than atmospheric pressure.

The portion of cylinder 237 back of the piston is open to the atmosphere preferably through an opening 241 within which a piston rod 242 reciprocates in response to the degree of vacuum within the cylinder. A lever 243 is pivotally supported as at 244, the upper end having the rod 242 pivoted thereto at 245 while the lower end of lever 243 has an articulated connection at 246 with a spring end cap 247—a stop 248 preferably being provided to limit the rearward movement of the upper end of lever 243 when piston 238 is substantially at its rearward limit of travel within cylinder 237.

The end cap 226' is adapted to support the spring 225' of my movement-reducing linkage against the end cap 247 and to transmit fore and aft movement to the shifter fork 207' through a pivotal connection 249. A pivotal support for fork 207' is provided as at 250 to position the yoke portion 206', as illustrated, counteracting almost the entire pressure of spring 204 by tending to push an extension 251 of rod 199' forwardly. It is obviously evident that as the yoke portion 206' is moved rearwardly slightly the spring 204 tends more and more to cause the fluid pressure within cylinder 202' to build up to maintain the piston 203' as illustrated. My automatic control is so arranged that the piston 238 will travel forwardly from its illustrated station to effect through the fork 207' a predetermined minimum pump pressure for example, I prefer to use one-fourth of the predetermined maximum pump pressure to prevent the speed ratio controlling devices 32 to 35 from slipping undesirably. To make this predetermined minimum pump pressure condition of my variable pressure regulating means positive, I have provided an adjustable stop 252 to limit the forward movement of the upper end of lever 243.

In the operation of this embodiment of my variable pressure regulating means, the pressure pump is fully automatic in its operation without any electrical mechanism—no control on the part of the vehicle driver being required.

This automatic control is effective whenever the engine A' is running. Maximum vacuum is created within the intake manifold 240 when the throttle is nearly closed and the engine pistons are reciprocating in the well known manner, and this provides through conduit 239 a vacuum in cylinder 237 ahead of piston 238—the piston being urged forwardly by the greater pressure of the atmosphere through cylinder opening 241 back of the piston until lever 243 strikes the stop 252 as described earlier. This movement of piston 238 swings the link connection 246 through a comparatively long arc which is dampened or reduced by spring 225' so that only a small arc of travel is transmitted to shifter fork connection 249 to cause the yoke portion 206' to substantially counteract the pressure of spring 204 against the rod 199'. When the yoke portion 206' is at its forward or predetermined minimum fluid pressure position, it opposes the pressure of spring 204, as has already been described, so that less pressure is required within cylinder 202' to maintain the pump in its leveled-off position. During idling and low speeds with low torque output of the engine A' it is desirable to have a certain amount of slippage of the speed ratio controlling devices 32 to 35. By the resulting movement of yoke portion 206' to its forward position the predetermined minimum fluid pressure effected causes the speed ratio devices to slip a desirable amount to overcome the inherent characteristic of a fluid coupling to creep while the engine A' is idling, or the grabbing of the speed ratio devices in cold weather while the engine is idling fast when the oil is tacky.

As the engine speed and torque output are increased the opening throttle reduces the vacuum in the manifold 240 and ahead of piston 238 to urge the latter rearwardly until the lever 243 strikes stop 248. During this movement of piston 238 the lever connection 246 swings forwardly in a comparatively long arc to expand spring 225' and move the yoke portion 206' gradually away from extension 251 so that the spring 204 acts directly against rod 199' to cause the required fluid pressure in cylinder 202' to be gradually increased to the predetermined maximum in the manner already described. Maximum pressure for the operation of the speed ratio devices is desirable during high torque output of the engine so that there will be little or no slippage. The reduction in fluid pressure in the transmission system is also practically desirable when the driver selects the various transmission speed ratios, as this will permit the selected speed ratio device to engage the drum smoothly and quietly and then to automatically increase its degree of engagement as the engine speed is increased. If it is desired to vary the predetermined minimum fluid pressure, the stop 252, is adapted to be adjusted forwardly or rearwardly to respectively reduce or increase this fluid pressure setting which controls the force with which the yoke portion 206' opposes the pressure of spring 204.

It is thus readily evident that my automatic control of the variable pump pressure regulating means completely controls every condition of drive of the motor vehicle by controlling the fluid pressure produced by the pressure pump so that the transmission speed ratio controlling devices are automatically controlled with a varying fluid pressure to effect the most desirable driving characteristics at the vehicle driver's pleasure.

Various modifications and changes may be effected in the illustrated application without departing from the spirit of the invention or from the scope of the appended claims.

What I claim is:

1. In a motor vehicle transmission having a plurality of speed ratio controlling devices, fluid pressure operated means for selectively operating said devices, means for supplying fluid under pressure to said pressure operated means, control mechanism for said fluid supply means, and vacuum actuated means acting on said mechanism for causing the latter to vary the fluid pressure delivery of said supply means.

2. In a motor vehicle planetary transmission having a plurality of planetary gear sets and associated friction controlling devices, fluid pressure operated means for selectively operating said devices, pump means for supplying fluid under pressure to said fluid pressure operated means, control mechanism for said pump including a piston movable by the fluid pressure to control the pressure of the fluid delivered by said pump, yielding means acting in opposition to movement of said piston, and means for varying the action of said yielding means for regulating the pump pressure delivery.

3. In a motor vehicle planetary transmission having a plurality of planetary gear sets and associated friction controlling devices, fluid pressure operated means for selectively operating said devices, pump means for supplying fluid under pressure to said fluid pressure operated means, control mechanism for said pump including a piston movable by the fluid pressure to control the pressure of the fluid delivered by said pump, yielding means acting in opposition to movement of said piston, and vacuum actuated means for varying the action of said yielding means for regulating the pump delivery pressure.

4. In a motor vehicle planetary transmission having a plurality of planetary gear sets and associated friction controlling devices, fluid pressure operated means for selectively operating said devices, pump means for supplying fluid under pressure to said fluid pressure operated means, said pump including a member having a plurality of cylinders, a pumping piston reciprocating in each of said cylinders, a wabble plate structure controlling movement of said pistons, control mechanism for said wabble plate structure comprising an accumulator cylinder adapted to receive fluid under pressure from said pump, a piston in said accumulator cylinder, yielding means acting in opposition to movement of said piston induced by fluid pressure, a piston rod operably connected to said accumulator piston, a lever disposed in the path of movement of said piston rod for movement thereby, said lever having an operable connection with said wabble plate structure, and means for varying the action of said yielding means for regulating the pump pressure delivery.

5. In a motor vehicle planetary transmission having a plurality of planetary gear sets and associated friction controlling devices, fluid pressure operated means for selectively operating said devices, pump means for supplying fluid under pressure to said fluid pressure operated means, said pump including a member having a plurality of cylinders, a pumping piston reciprocating in each of said cylinders, a wabble plate structure controlling movement of said pistons, control mechanism for said wabble plate structure comprising an accumulator cylinder adapted to receive fluid under pressure from said pump, a piston in said accumulator cylinder, yielding means acting in opposition to movement of said piston induced by fluid pressure, a piston rod operable connected to said accumulator piston, a lever disposed in the path of movement of said piston rod for movement thereby, said lever having an operable connection with said wabble plate structure, and manually operable means for varying the action of said yielding means for regulating the pump pressure delivery.

6. In a motor vehicle planetary transmission having a plurality of planetary gear sets and associated friction controlling devices, fluid pressure operated means for selectively operating said devices, pump means for supplying fluid under pressure to said fluid pressure operated means, said pump including a member having a plurality of cylinders, a pumping piston reciprocating in each of said cylinders, a wabble plate structure controlling movement of said pistons, control mechanism for said wabble plate structure comprising an accumulator cylinder adapted to receive fluid under pressure from said pump, a piston in said accumulator cylinder, yielding means acting in opposition to movement of said piston induced by fluid pressure, a piston rod operably connected to said accumulator piston, a lever disposed in the path of movement of said piston rod for movement thereof, said lever having an operable connection with said wabble plate structure, and vacuum actuated means for varying the action of said yielding means for regulating the pump pressure delivery.

7. In a motor vehicle, a variably operable prime mover having variably operable vacuum producing means, a power transmission mechanism having a plurality of speed ratio controlling devices, pressure fluid operated means for selectively operating said devices, means for supplying pressure fluid to said pressure operated means, control mechanism for said pressure fluid supply, said control mechanism comprising a pressure responsive member, yielding means acting in opposition to said member, and means operable by said vacuum producing means for progressively varying said opposition of said yielding means in response to variations in the operation of said vacuum producing means.

8. In a motor vehicle transmission having a plurality of speed ratio controlling devices, fluid pressure operated means including a common operating member for selectively operating said devices, manually operable means for controlling the selective operation of said operating member, mechanism for controlling the operation of said member in response to operation of said manually operable selective means, means for supplying pressure fluid to said member, a pressure fluid control in said fluid supply including a pressure responsive element, yielding means acting in opposition to said element, and means for causing operating of said control mechanism, said last named means being so constructed and arranged as to cause said yielding means to vary the pressure fluid supply to said member.

9. In a motor vehicle transmission having a plurality of speed ratio controlling devices, a common operating member for selectively operating said devices, means including a pump for supplying a fluid operating pressure to said member, control mechanism for said pump including a piston movable by the fluid pressure to control the pressure of fluid delivered by said pump, yielding means acting in opposition to movement of said piston, valve means for controlling the supply of fluid pressure from said pump to said member, valve operating mechanism, and means operable to cause actuation of said valve operating mechanism, said last named means being so constructed and arranged as to vary the action of said yielding means for regulating the pump pressure delivery.

10. In a motor vehicle, a prime mover having variable operable vacuum producing means, a power transmission mechanism having a plurality of speed ratio controlling devices, fluid pressure operated means for selectively operating said devices, means for supplying a fluid under operating pressure to said pressure operated means, means for controlling the pressure of fluid delivered by said supply means to said fluid pressure operated means, and means for causing said control means to vary the fluid pressure delivered by said supply means to said fluid pressure operated means in response to variations in the vacuum produced by said vacuum producing means.

11. In a motor vehicle, a prime mover having variable operable vacuum producing means, a power transmission mechanism having a plurality of speed ratio controlling devices, fluid pressure operated means for selectively operating said devices, means including a pump for supplying a fluid under operating pressure to said pressure operated means, means for varying the fluid displacement of said pump, and means for causing said control means to vary the fluid displacement of said pump in response to variations in the vacuum produced by said vacuum producing means.

12. In a motor vehicle transmission having a plurality of speed ratio controlling devices, fluid pressure operated means for selectively operating said devices, means for supplying fluid under pressure to said pressure operated means, control mechanism for said fluid pressure supply means comprising a member movable by the fluid pressure to control the pressure of the fluid delivered by said supply means, yielding means acting in opposition to movement of said member, and vacuum actuated means for varying the action of said yielding means for regulating the fluid pressure delivered by said supply means.

13. In a motor vehicle, a variable operable prime mover, a power transmission mechanism having a plurality of selectively operable fluid pressure operated speed ratio controlling devices, means including a pump for supplying a fluid under operating pressure to said devices, and means responsive to variations in the operation of said prime mover for varying the fluid displacement of said pump.

14. In a motor vehicle, a variably operable prime mover, a power transmission mechanism having a plurality of speed ratio controlling devices, pressure fluid operated means for selectively operating said devices, means including a pump for supplying a fluid under operating pressure to said pressure operated means, mechanism responsive to pressure of fluid supplied by said pump for controlling the operation of said pump, and means responsive to variations in the operation of said prime mover for causing said mechanism to vary the operation of said pump in response to variations in the operation of said prime mover.

15. In a motor vehicle, an internal combustion engine having variably operable vacuum producing means, a power transmitting mechanism including a fluid pressure operated drive control device, means including a pump for supplying a fluid under operating pressure to said device, and means operable by the vacuum produced by said vacuum producing means for varying the fluid displacement of said pump in response to variations in the operation of said vacuum producing means.

16. In a power transmitting mechanism including a plurality of selectively operable fluid pressure operated speed ratio controlling devices, means for supplying fluid under pressure to said pressure operated devices, control mechanism for said fluid pressure supply means comprising a member movable by the fluid pressure to control the pressure of the fluid delivered by said supply means, yielding means acting in opposition to movement of said member, and vacuum actuated means for varying the action of said yielding means for regulating the fluid pressure delivered by said supply means.

17. In a power transmitting mechanism including a fluid pressure operated drive control device, a pump for supplying a fluid under operating pressure to said device, control means for said pump including a fluid pressure actuated element, yielding means acting in opposition to fluid pressure actuation of said element, and means operable to vary the opposition of said yielding means for varying the fluid displacement of said pump.

18. In a power transmitting mechanism for a motor vehicle including a fluid pressure operated speed ratio controlling device, means including a pump for supplying a fluid under operating pressure to said device, and means operable to vary the fluid delivery output of said pump, said means including a member operable by the pressure of fluid delivered by said pump, a yieldable member opposing fluid pressure operation of said last mentioned member, and vehicle driver operated means operable to vary said opposition of said yieldable member.

19. In a motor vehicle, an internal combustion engine having variably operable vacuum producing means, a driving member, a member adapted to be driven by said driving member, a fluid pressure operated device operable to drivingly connect said members, means for supplying a fluid under operating pressure to said device, valve means operable to control fluid pressure operation of said device, and vacuum actuated means operable in response to variations in the operation of said vacuum producing means to progressively vary the pressure of fluid supplied to said device during operation thereof under control of said valve means.

20. In a motor vehicle, an internal combustion engine having variably operable vacuum producing means, power transmitting means including a plurality of selectively operable fluid pressure operated drive control devices, means controlling the selective operation of said devices, means for supplying a fluid under operating pressure to said devices, and vacuum actuated means operable in response to variations in the operation of said vacuum producing means to progressively vary the pressure of fluid supplied to said device during operation thereof under control of said control means.

21. In a vehicle driving system comprising, an internal combustion engine having variably operable vacuum producing means, a driving member, a member adapted to be driven by said driving member, a fluid pressure operated device operable to drivingly connect said members, means for supplying a fluid under operating pressure to said device for operation thereof, and means operably associated with said vacuum producing means and said supply means and operable in response to variations in the operation of said vacuum producing means to progressively vary the pressure of fluid supplied to said device during operation of the latter.

TENO IAVELLI.